Sept. 2, 1941.  K. H. ANDREN  2,254,766
MOTION TRANSMITTING MECHANISM
Filed June 15, 1940   2 Sheets-Sheet 2
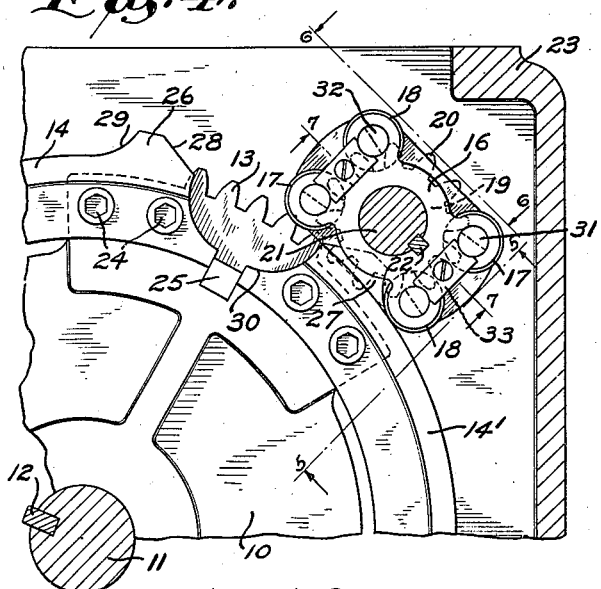
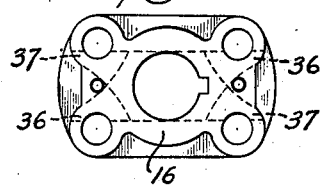
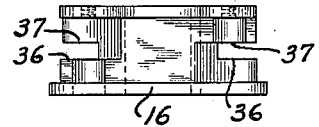
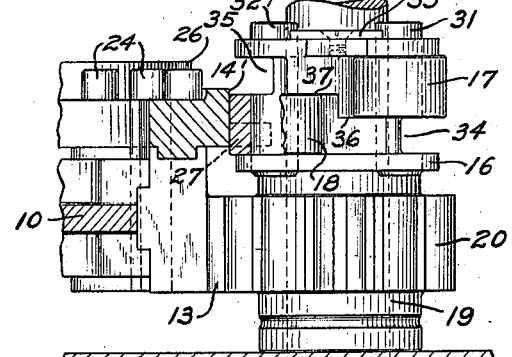
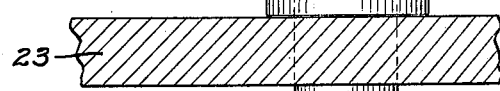
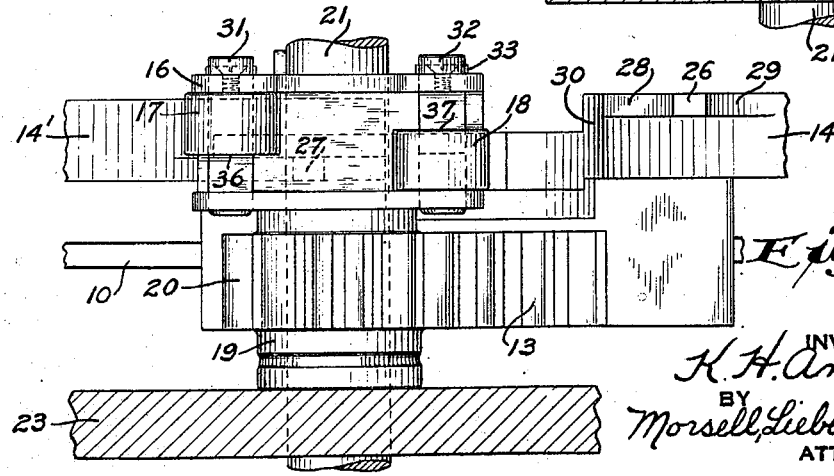
INVENTOR
K. H. Andren
BY
Morsell, Liebert & Morsell
ATTORNEYS.

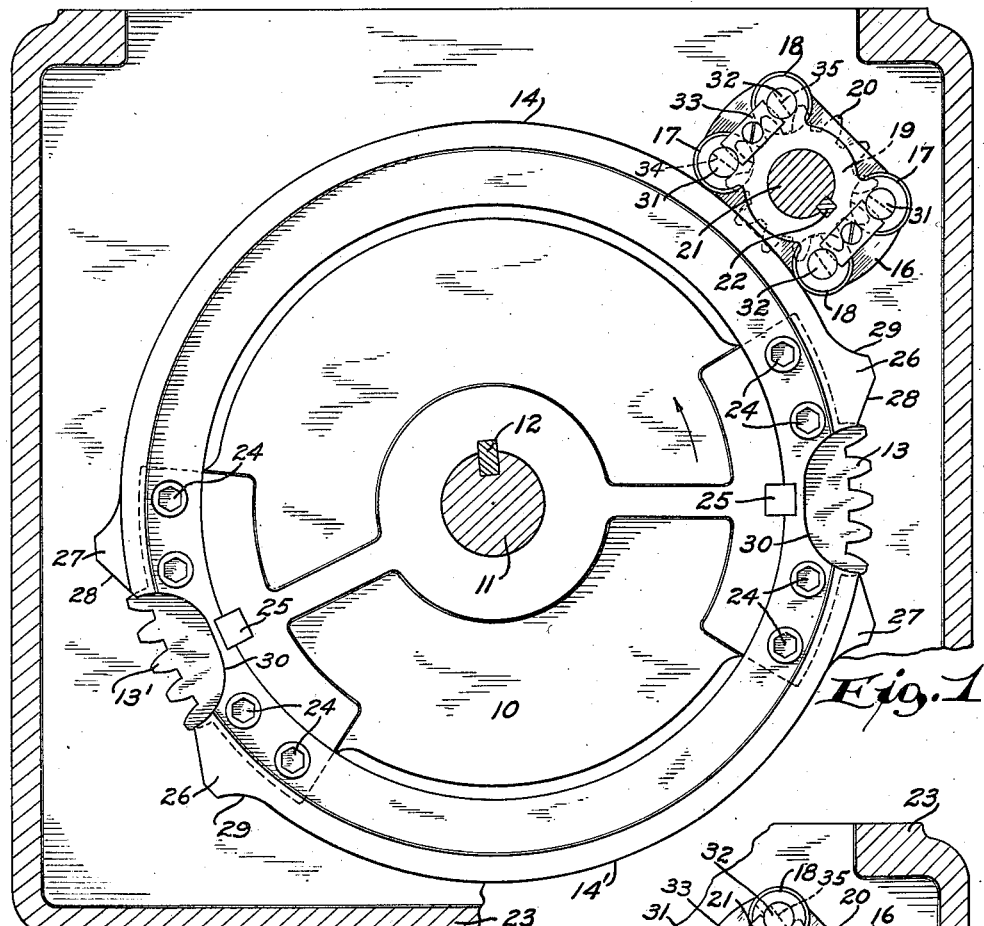
Fig. 1.
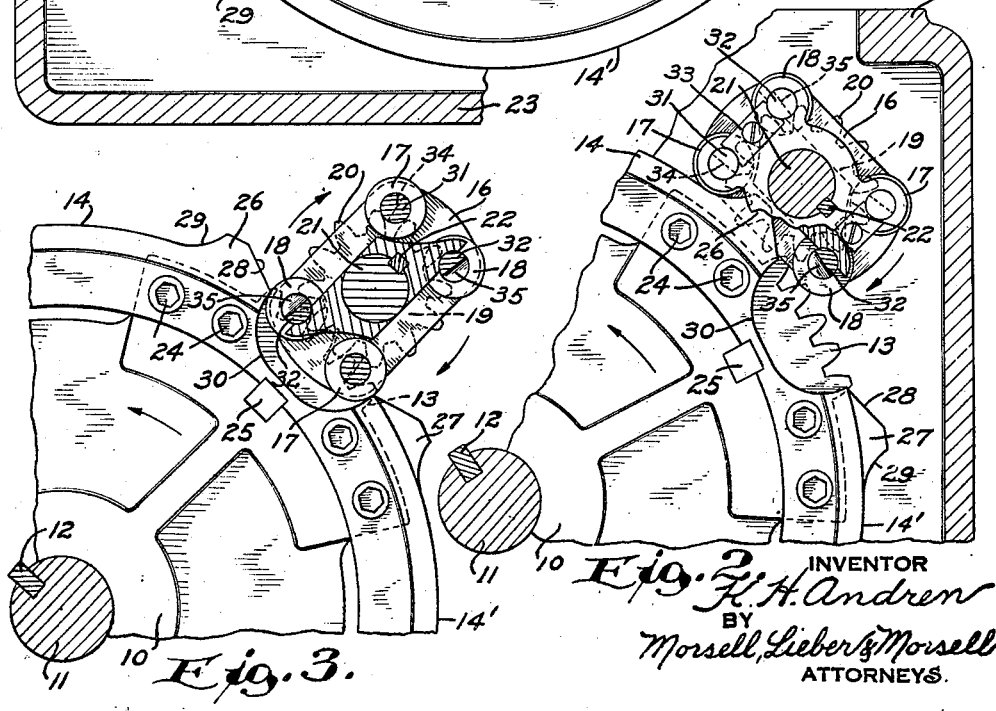
Fig. 2.
Fig. 3.

Patented Sept. 2, 1941

2,254,766

UNITED STATES PATENT OFFICE 2,254,766

MOTION TRANSMITTING MECHANISM

Karl H. Andren, Milwaukee, Wis., assignor to Artos Engineering Company, Milwaukee, Wis., a corporation of Wisconsin Application June 15, 1940, Serial No. 340,685

19 Claims. (Cl. 74—435)

My invention relates in general to improvements in the art of transferring motion from one machine element to another, and relates more specifically to improvements in the construction and operation of mechanism for transmitting movement from a continuously moving member to an intermittently movable member or members.

An object of the present invention is to provide improved mechanism for converting definite movement of one member into similar but interrupted motion of another, and for utilizing the prime mover to positively prevent motion of the other member during periods of rest.

Another object of the invention is to provide simple mechanism for transmitting rotary intermittent motion from a driver to a driven element, and for locking the driven element against rotation when the driver is inactive.

A further object of my invention is to provide improved toothed gearing for positively transferring rotary motion from one member to another, so that the latter will be intermittently revolved and will be brought into driving coaction with the former without impact or shock.

Still another object of my present invention is to provide improved power transmitting mechanism which may be utilized in various types of machines, for imparting rotary movement from a continuously revolving driving element to one or more intermittently revolvable driven elements through coacting teeth associated with the respective elements.

An additional object of the present invention is to provide compact and durable means for bringing the teeth of two gears into coaction with each other both gently and smoothly, and for likewise releasing the driving connection between the gears.

These and other objects of the invention will be apparent from the following detailed description.

A clear conception of an embodiment of the invention, and of the mode of constructing and of operating a rotary motion transmitting mechanism built in accordance with the improvement, may be had by referring to the drawings accompanying and forming a part of this specification wherein like reference characters designate the same or similar parts in the various views.

Fig. 1 is a top view of a commercial embodiment of the invention, showing the driving element rotating while the driven element is at rest and locked against rotation;

Fig. 2 is a fragmentary similar view showing the driven element released for rotation and the cam for initiating rotation thereof in action;

Fig. 3 is another fragmentary similar view showing the driven element being rotated by meshing of its pinion teeth with the driving segment gear;

Fig. 4 is still another fragmentary similar view, showing the position of the driven element immediately after rotation thereof;

Fig. 5 is a somewhat enlarged fragmentary section through the driving element and an elevation of the driven element, the section being taken along the line 5—5 of Fig. 4;

Fig. 6 is another similarly enlarged elevation of the driven element and of a fragment of the driving element, with a section through the casing taken along the line 6—6 of Fig. 4;

Fig. 7 is a similarly enlarged central section through the driven element, taken along the line 7—7 of Fig. 4;

Fig. 8 is a top view of the driven element roller carrier; and

Fig. 9 is a side view of the roller carrier of Fig. 8.

While the embodiment of the invention specifically illustrated and described herein, discloses a motion transmitting mechanism adapted to impart a half revolution from a continuously rotating driving element to a single intermittently rotatable driven element, twice during each complete revolution of the driver, it is not my desire or intention to thereby unnecessarily restrict the scope or untility of the improvement, since the mechanism can be readily duplicated so that a single rotating driver will intermittently impart one or more partial or complete revolutions to two or more driven elements.

Referring to the drawings, the improved motion or power transmitting mechanism shown therein, comprises in general, a driving element consisting of a rotary disk-like member 10 secured to a power shaft 11 by means of a key 12, and having local sets of peripheral gear teeth 13, 13' and intervening peripheral rim sections 14, 14'; and a driven element consisting of an upper carrier or bracket 16 having upper and lower rollers 17, 18 journalled therein for cooperation with the segment rims 14, 14' and a lower pinion 19 the teeth 20 of which are adapted to mesh with the teeth 13, 13', both the bracket 16 and the pinion 19 being secured to a driven shaft 21 by means of a key 22. The power shaft 11 may be rotated either continuously or intermittently from any suitable power source to correspondingly rotate the member 10, and the driven shaft 21 may be connected to any suitable motion utilizing device such as a wire or cable feeding and stripping carriage; and the shafts 11, 21 may be journalled for rotation within a casing 23 to which lubricant may be abundantly admitted so as to insure proper lubrication of the mechanism at all times.

The peripheral rim sections 14, 14' have outer curved surfaces which constitute parts of a common cylindrical surface generated about the axis of the power shaft 11, and these sections 14, 14' may be formed integral with or rigidly attached to the member 10 by means of screws 24 and keys 25. Each of the rim sections 14, 14' has an upper cam projection 26 at one end, and a similar but reversely disposed lower cam projection 27 at its opposite end, these projections 26, 27 being revolvable in vertically spaced planes and the cylindrical surfaces of the sections 14, 14' extending below the upper projections 26 and above the lower projections 27. Each of the projections 26, 27 has a sloping straight surface cam 28, and a curved opposed surface 29, these surfaces 28, 29 being separated by a short outer surface. The end projections 26, 27 at the adjacent ends of the two sections 14, 14' are separated by approximately semi-circular recesses 30; and the teeth 13, 13' which are formed integral with the member 10, extend across and are located beneath these recesses 30.

The projections 26, 27 may be of similar shape but reversely positioned, and if the projections are so formed, it may be desirable to provide a friction brake on the driven shaft 21 in order to prevent undesirable noise when the rotation of the shaft 21, pinion 20, and bracket 16 is suddenly and quickly arrested. As previously indicated, the bracket 16 and pinion 20 are rigidly attached to the driven shaft 21, and the upper and lower rollers 17, 18 are journalled for rotation on mutilated pivot pins 31, 32 respectively, which are rigidly secured to the top and bottom plates of the bracket 16 by means of locking plates 33. The plates 33 lock the pins 31, 32 against rotation and against axial displacement, while permitting ready removal of the pins; and the pins 31 on which the upper rollers 17 are journalled, are provided with lower transverse grooves or cut-outs 34 for permitting free passage of the lower projections 27 therethrough, while the pins 32 which rotatably support the lower rollers 18 have upper grooves or cut-outs 35 for permitting free passage of the upper projections 26 therethrough, when the member 10 revolves. The rollers 17 are maintained above the cut-outs 34 of the pins 31 by means of ledges 36 formed on the bracket 16, and the other rollers 18 are similarly maintained below the cut-outs 35 of the pins 32 by ledges 37; and while both rollers 17, 18 on one of the longer sides of the bracket 16 are adapted to simultaneously engage either section 14, 14' of the member 10, the upper projections 26 are adapted to engage only the upper rollers 26 whereas the lower projections 27 are adapted to engage only the lower rollers 18.

During normal operation of the improved motion transmitting mechanism, the power shaft 11 and member 10 may be rotated in either direction, in order to impart intermittent rotation in the opposite direction to the driven shaft 21. Assuming that the shaft 11 and member 10 are rotating in a counter-clockwise direction as indicated in Fig. 1, and that the rollers 17, 18 at one side of the driven element are coacting with the outer cylindrical surface of the rim section 14. The driven shaft 21 is then locked against possible rotation by virtue of the coaction of the spaced rollers 17, 18 with the peripheral surface of the driving element. As the projection 26 of the driving element nearest the driven element approaches the position shown in Fig. 2, the upper projection 26 will ride freely through the cut-out 35 in the adjacent pin 32, and the curved surface 29 of this projection will eventually attain the position of Fig. 2 and will engage the adjacent roller 17. This engagement of the curved projection surface 29 with the roller 17 takes place before the pinion teeth 20 have engaged the teeth 13 of the driving element, and as the roller 17 rides along the curved surface 29 of the upper projection 26, the driven element will gradually have initial rotation imparted thereto. When the driven element has been thus initially set in motion, the teeth 13 of the driving element are brought into smooth contact with the teeth 20 of the pinion 19, and the shaft 21 is thus positively rotated until the teeth 20 are again removed from contact with the teeth 13. During this rotation of the driven element, the rollers 17, 18 which are nearest the driving element, will pass freely through the adjacent recess 30 as clearly shown in Fig. 3. The advancing teeth 13 will ultimately leave the teeth 20 of the pinion 19, and during this separation of the driving teeth, one of the lower rollers 18 will engage the curved surface of the adjacent projection 27, as clearly shown in Fig. 4, and will ride along the outer cylindrical surface of the other rim surface 14'. Continued rotation of the member 10, will cause the roller 17 on the same side of the bracket 16 to subsequently also engage the outer or peripheral surface of the section 14', thereby again locking the driven element against rotation. As the rotation of the member 10 continues, the projections 26, 27 and the local teeth 13' on the opposite side of the driving element will become effective and will function in the manner just described, thereby imparting another partial revolution to the driven element. In this manner the driven element will be intermittently partially rotated, twice during each complete revolution of the driving element, and the release of the driven element, the rotation thereof, and the re-locking, are all effected smoothly and without impact. The motion transmission will obviously continue so long as the power shaft 11 is being rotated, and while the mechanism shown herein is adapted to impart only one-half a revolution to the driven shaft 21 during each intermeshing of the teeth 13, 13' with the pinion teeth 20, the extent of rotation of the driven shaft 21 may obviously be varied by utilizing a lesser or greater number of teeth 13, 13' and rollers 17, 18 in each local segment.

From the foregoing detailed description it will be apparent that my present invention provides a simple, compact, and highly efficient mechanism for transferring rotary motion from a driving to a driven element, in such manner that the driven element is intermittently revolved while being locked against rotation by the driving element during periods of rest. The rollers 17, 18 by virtue of their coaction with the curved surfaces 29 of the projections 26, 27, produce gradual rotation of the driven element and smooth engagement of the gear teeth 13, 20 with each other, whenever the driven shaft 21 is being rotated. These rollers 17, 18 moreover positively prevent the driven shaft 21 from rotating when the teeth 13 and projections 27 are not effective, and the rotary motion of the shaft 21 is effectively arrested and the rollers 17, 18 are brought into locking engagement with the sections 14, 14' whenever the engagement of the gear teeth is interrupted. As previously indicated, a single driving element may be utilized to intermittently actuate any desired number of driven elements, and by varying the number of teeth 13, and rollers the degree of rotation of the driven elements may be readily altered. The improvement has proven highly successful in actual commercial use, and may be utilized for many different purposes although it has been found especially advantageous in the operation of cutting and stripping machinery. It is also noteworthy, that by utilizing a greater number of teeth 13, 13' in one set than in another set associated with the same driving element, the driven element may be rotated different amounts as the teeth 29 thereof engage the successive sets of teeth 13, 13', thus making it possible to meet various operating conditions. While the various parts have been described as being disposed in vertical or horizontal position, the improved mechanism will operate equally as well regardless of the disposition of the shafts and elements.

It should be understood that it is not desired to limit this invention to the exact details of construction or to the precise mode of operation of the mechanism, herein shown and described, for various modifications within the scope of the claims may occur to persons skilled in the art.

I claim:

1. In combination, a driving element rotatable about an axis and having peripheral teeth, a driven element having peripheral teeth cooperable with the teeth of said driving element to intermittently rotate said driven element about another axis, and a roller carried by one of said elements and coacting with the periphery of the other to alternately impart initial rotation to and to aid in preventing rotation of said driven element during a portion of each revolution of said driving element.

2. In combination, a driving element rotatable about an axis and having local peripheral teeth and a smooth rim beyond the opposite end teeth, a driven element having peripheral teeth cooperable with the teeth of said driving element so as to intermittently rotate said driven element about another axis, and spaced rollers carried by said driven element and being cooperable with said smooth rim to positively prevent rotation of said driven element when said driving and driven element teeth are out of engagement, one of said rollers also coacting with said driving element to impart initial rotation to said driven element.

3. In combination, a driving element rotatable about an axis and having local peripheral teeth and a smooth rim beyond the opposite end teeth, a driven element having peripheral teeth cooperable with the teeth of said driving element so as to intermittently rotate said driven element about another axis, and spaced rollers carried by said driven element near the teeth thereon and eccentrically of its axis of rotation, said rollers being cooperable with said driving element rim to positively prevent turning of said driven element about its axis when said teeth are out of mesh, and one of said rollers being cooperable with said driving element to impart initial rotation to said driven element.

4. In combination, a rotary driving element having local teeth and cylindrical surfaces adjoining said teeth, a rotary driven element having teeth cooperable with said driving element teeth to intermittently rotate said driven element, and spaced rollers carried eccentrically of the axis of rotation of said driven element and being cooperable with said surfaces when said teeth are out of mesh to prevent rotation of said driven element, said rollers being cooperable with said driving element to impart periodic initial rotation to said driven element.

5. In combination, a rotary driving element having local teeth and cylindrical surfaces adjoining said teeth, a rotary driven element having teeth cooperable with said driving element teeth to intermittently rotate said driven element, and spaced rollers revolvable about the axis of said driven element during rotation thereof and being cooperable with said surfaces when said teeth are out of mesh to positively prevent rotation of said driven element, said rollers being cooperable with said driving element to impart initial periodic rotation to said driven element and to arrest the rotation thereof.

6. In combination, a rotary driving element having local teeth and cylindrical surfaces adjoining said teeth, a rotary driven element having teeth cooperable with said driving element teeth to intermittently rotate said driven element, a roller revolvable with and about the axis of rotation of said driven element and being cooperable with said surfaces when said driven element is at rest, and a curved projection on said driving element adjacent to the end of each of said surfaces for engaging said roller to impart initial rotation to said driven element directly prior to each intermeshing of said teeth.

7. In combination, a rotary driving element having local teeth and cylindrical surfaces adjoining said teeth, a rotary driven element having teeth cooperable with said driving element teeth to intermittently rotate said driven element, a roller revolvable with and about the axis of rotation of said driven element and being cooperable with said surfaces to prevent rotation of said driven element, and a projection on said driving element coacting with said roller to impart initial rotation to said driven element.

8. In combination, a rotary driving element having local sets of gear teeth and projections adjoining the ends of said sets, a driven element having gear teeth cooperable with said driving element teeth to intermittently rotate said driven element, and a set of rollers revolvable with and about the axis of said driven element and coacting with said projections to initially rotate said driven element and to arrest the rotation thereof.

9. In combination, a rotary driving element having local sets of gear teeth and projections adjoining the ends of said sets, a driven element having gear teeth cooperable with said driving element teeth to intermittently rotate said driven element, and a roller revolvable with and about the axis of said driven element and coacting with said projections to initially rotate said driven element, said roller being cooperable with the periphery of said driving element to aid in preventing rotation of said driven element when said teeth are disengaged.

10. In combination, a continuously rotating driving element having sets of local gear teeth and smooth peripheral surfaces between said sets, a driven element having a continuous annular series of gear teeth adapted to coact with said sets in succession to intermittently rotate said driven element, a series of spaced rollers carried by said driven element near the teeth thereof and coacting with said surfaces to prevent rotation of said driven element, and projections on said driving element near said tooth sets and coacting with said rollers to impart initial rotation to said driven element directly preceding each intermeshing of said teeth.

11. In combination, a continuously rotating driving element having sets of local gear teeth and smooth peripheral surfaces between said sets, a driven element having a continuous annular series of gear teeth adapted to coact with said sets in succession to intermittently rotate said driven element, a series of spaced rollers carried by said driven element near the teeth thereof, and projections on said driving element near said tooth sets and coacting with said rollers to impart initial rotation to said driven element directly preceding each intermeshing of said teeth, two rollers of said series being cooperable with one of said surfaces to prevent rotation of said driven element whenever said teeth are disengaged.

12. In combination, a continuously rotating driving element, a driven element intermittently rotatable at higher speed by said driving element, rollers carried by one of said elements and being revolvable about the axis of rotation thereof, and means carried by the other element and cooperating with said rollers to gradually accelerate and decelerate said driven element at the beginning and end of each driving period, said rollers being cooperable with said driving element to prevent rotation of said driven element during interims between said driving periods.

13. In combination, a rotary driving element, a driven element intermittently rotatable by said driving element, and rollers carried by and being revolvable about the axis of rotation of said driven element, said rollers being alternately cooperable with said driving element to gradually accelerate said driven element at the beginning of each driving period and to prevent rotation of said driven element during interims between said driving periods.

14. In combination, a rotary driving element, a driven element intermittently rotatable by said driving element, and rollers carried by and being revolvable about the axis of rotation of said driven element, said rollers being alternately cooperable with said driving element to gradually decelerate said driven element at the end of each driving period and to prevent rotation of said driven element during interims between said driving periods.

15. In combination, a rotary driving element, a driven element intermittently rotatable by said driving element, and rollers carried by and being revolvable about the axis of rotation of said driven element, said rollers being successively cooperable with said driving element to first gradually accelerate said driven element at the beginning of each driving period, to then gradually decelerate said driven element at the end of each driving period, and to thereafter prevent rotation of said driven element during the interim following said driving period.

16. In combination, a rotary driving element having a local series of gear teeth and a smooth peripheral surface between the opposite ends of said series, a driven pinion having teeth adapted to mesh with said gear teeth to intermittently rotate the pinion, a series of rollers carried by said pinion near the teeth thereof, and means carried by said driving element near said gear teeth and coacting with said rollers to impart initial rotation to said pinion directly preceding each intermeshing of said teeth, two rollers of said series being cooperable with said surface to prevent rotation of said pinion when said teeth are disengaged.

17. In combination, a rotary driving element having a local series of gear teeth and a smooth peripheral surface between the opposite ends of said series, a driven pinion having teeth adapted to mesh with said gear teeth to intermittently rotate the pinion, a series of rollers carried by said pinion near the teeth thereof, and a projection on said driving element in advance of said gear tooth series and coacting with said rollers to impart initial rotation to said pinion directly preceding each intermeshing of said teeth, several rollers of said series being cooperable with said surface to prevent rotation of said pinion when said teeth are disengaged.

18. In combination, a rotary driving element having a local series of gear teeth and a smooth peripheral surface between the opposite ends of said series, a driven pinion having teeth adapted to mesh with said gear teeth to intremittently rotate the pinion, a series of rollers carried by said pinion near the teeth thereof, and a projection on said driving element at the trailing end of said gear tooth series and coacting with said rollers to gradually stop said pinion directly following each intermeshing of said teeth, several rollers of said series being cooperable with said surface to prevent rotation of said pinion when said teeth are disengaged.

19. In combination, a mutilated driving gear having a local set of teeth and a smooth peripheral surface between the opposite ends of said set, a driven pinion having teeth adapted to mesh with said gear teeth to periodically rotate the pinion, a series of rollers carried by said pinion, and projections on said gear near the opposite ends of said tooth set, said rollers being cooperable with said projections to accelerate and decelerate said pinion and also being cooperable with said surface to prevent rotation of the pinion when said gear and pinion teeth are out of mesh.

KARL H. ANDREN.